(12) United States Patent
Dodge et al.

(10) Patent No.: US 6,471,291 B1
(45) Date of Patent: Oct. 29, 2002

(54) ANATOMICALLY CORRECT BICYCLE SEAT

(76) Inventors: John R. Dodge, 12272 Utica Pl., Broomfield, CO (US) 80020; John P. Dodge, 1507 Brixham Ave., McHenry, IL (US) 60050

( * ) Notice: Subject to any disclaimer, the term of this patent is extended or adjusted under 35 U.S.C. 154(b) by 0 days.

(21) Appl. No.: 09/625,337

(22) Filed: Jul. 25, 2000

(51) Int. Cl.[7] .................................................. B62J 1/02
(52) U.S. Cl. ............................................................ 297/209
(58) Field of Search ............................ 297/195.1, 209, 297/208, 214

(56) References Cited

U.S. PATENT DOCUMENTS 6,113,184 A * 9/2000 Barnes
6,135,550 A * 10/2000 Tucho

* cited by examiner

Primary Examiner—Milton Nelson, Jr.
(74) Attorney, Agent, or Firm—Mathew R. P. Perrone, Jr.

(57) ABSTRACT

An anatomically and ergonomically correct bicycle seat has a pair of U-shaped brackets supporting the seat on a bicycle, which seat includes a platform to receive the buttocks of a bicycle rider and a support mechanism for the platform in order to permit the seat to be mounted on a bicycle.

3 Claims, 4 Drawing Sheets

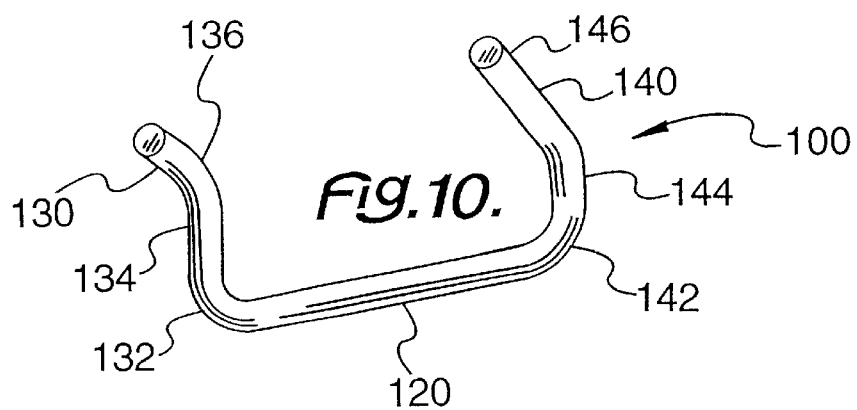
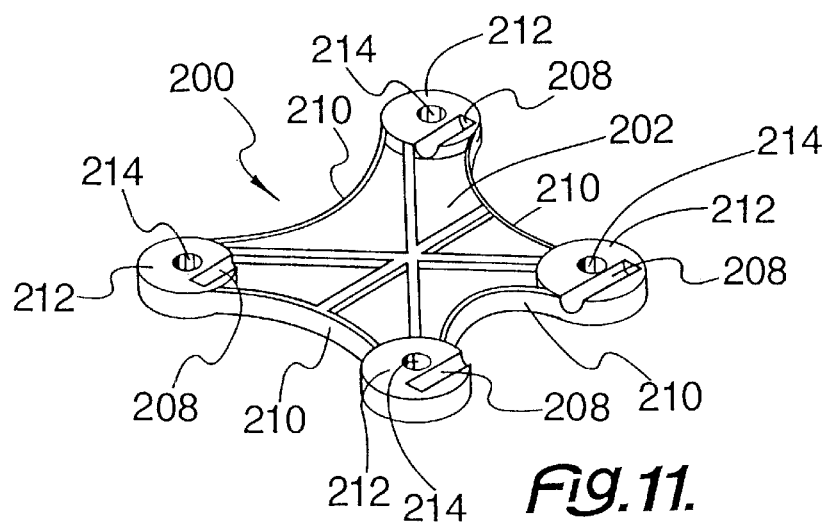
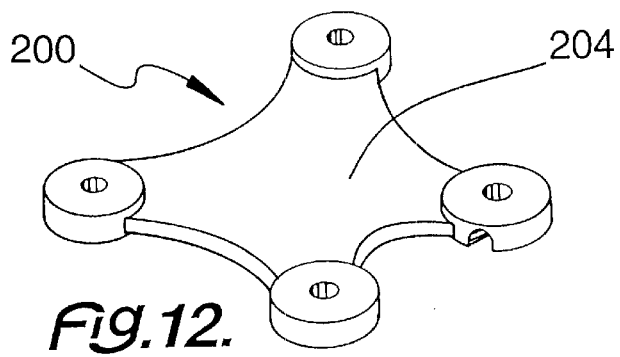

ANATOMICALLY CORRECT BICYCLE SEAT

This invention relates to a bicycle seat, and more specifically to a bicycle seat which is easily mounted on a bicycle and has a minimized adverse effect on the groin and genitalia of a bicycle rider.

BACKGROUND OF THE INVENTION

Traditional bicycle seats are saddle-shaped and put all of the cyclist's weight on the pubic tubercle and ischiopubic ramus of the pelvis. The recent literature cites increasing reports by cyclists, amateurs and professionals alike, who suffer adverse effects therefrom. Typical adverse experiences, caused by pressure induced by the currently designed saddle-shaped bicycle seat resulting in blunt trauma to the perineal and pelvic structures, suffered include the following symptoms: groin numbness or paresthesia, penile numbness or paresthesia, immediate impotence, delayed impotence, inability to ejaculate or experience orgasm, or the possible correlation with an elevated prostate specific antigen score.

The horn of the saddle designed seat fits directly against the before mentioned pelvic structures. This results in occlusion of arteries and veins supplying blood flow to the penis, as well as, compression of local nerves as they are sandwiched between the horn of the bicycle seat and the bony structures of the anterior pelvis. The resultant outcome is a numbing effect or paresthesia, as reported by many cyclists, that can result in sustained paresthesia of the groin and penis, delayed or immediate impotence, and perhaps even an elevated prostate specific antigen.

Many scientific studies are known to have considered this problem, which are reported in U.S. Pat. Nos. 5,988,739 and 6,019,423 to Mr. John P. Dodge and Dr. John R. Dodge, which are incorporated herein by reference.

This particular type of very desirable seat becomes less useful if it may not be adapted to be fitted onto a variety of bicycles. Thus, if a seat of this type can be adapted to a number of different bicycles, it becomes much more useful.

Thus, it proper to conclude that there is a major problem with bicycle seat design. This problem requires an effective solution.

SUMMARY OF THE INVENTION

Among the many objectives of this invention is the provision of a bicycle seat adapted to protect the genital area of a rider.

A further objective of this invention is to provide an anatomically correct seat to assist in the positioning of a rider on the bicycle.

A still further objective of this invention is to provide an anatomically correct seat to provide comfort for a rider.

Yet a further objective of this invention is to provide an anatomically correct seat to avoid arterial pressure on a rider.

Also, an objective of this invention is to provide an anatomically correct seat with strong seat support.

Another objective of this invention is to provide an anatomically correct seat for use on a bicycle.

Yet another objective of this invention is to provide an anatomically correct seat for relieving pressure on the bone structure.

Still, another objective of this invention is to provide an anatomically correct seat to provide comfort for a rider.

A further objective of this invention is to provide a mounting device in order to permit an anatomically correct seat to be mounted on any type of a bicycle.

A still further objective of this invention is to provide a U-shaped bracket suitable for mounting an anatomically correct seat on a bicycle.

These and other objectives of the invention (which other objectives, become clear by consideration of the specification, claims and drawings as a whole) are met by providing an ergonomically and anatomically correct bicycle seat having a pair of U-shaped brackets supporting the seat on a bicycle, which seat includes a platform to receive the buttocks of a bicycle rider and a support mechanism for the platform in order to permit the anatomically correct seat to be mounted on a bicycle.

BRIEF DESCRIPTION OF THE DRAWINGS

FIG. 10 depicts a bottom, perspective view of the U-shaped bracket 100 of this invention used in combination with the ergonomically correct seat 110 and a clamp platform 200.

FIG. 11 depicts a viewable side 202 perspective view of the clamp platform 200 of this invention.

FIG. 12 depicts a covered side 204 perspective view of the clamp platform 200 of this invention.

Throughout the figures of the drawings, where the same part appears in more than one figure of the drawings, the same number is applied thereto.

DESCRIPTION OF THE PREFERRED EMBODIMENTS

Figure 1:
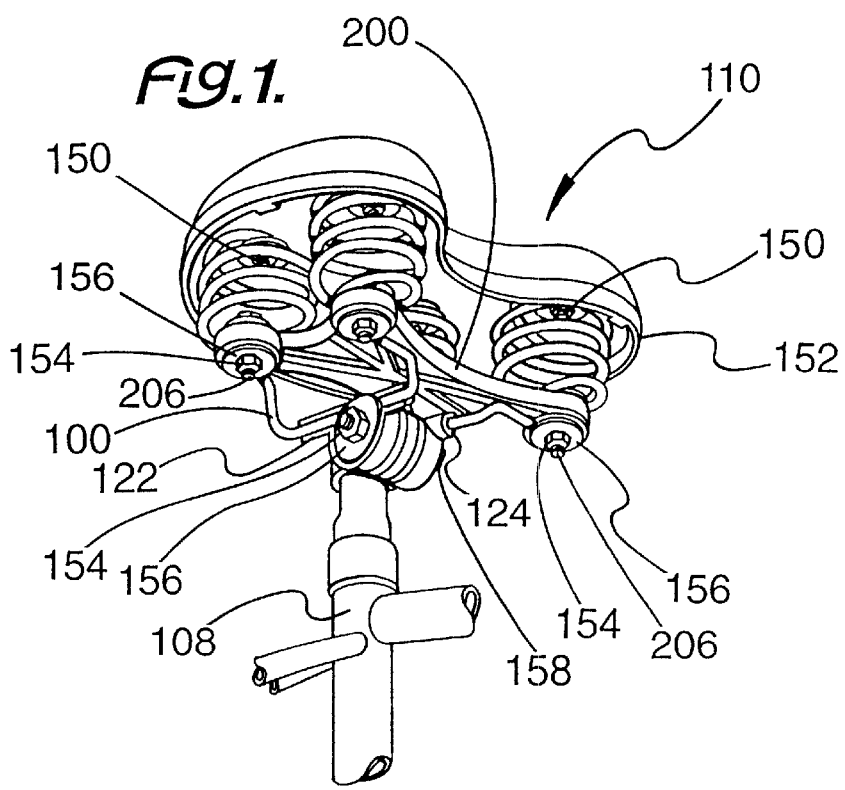
FIG. 1 depicts a bottom perspective view of U-shaped brackets 100 supporting ergonomically correct seat 110 a bicycle 108.
Figure 2:
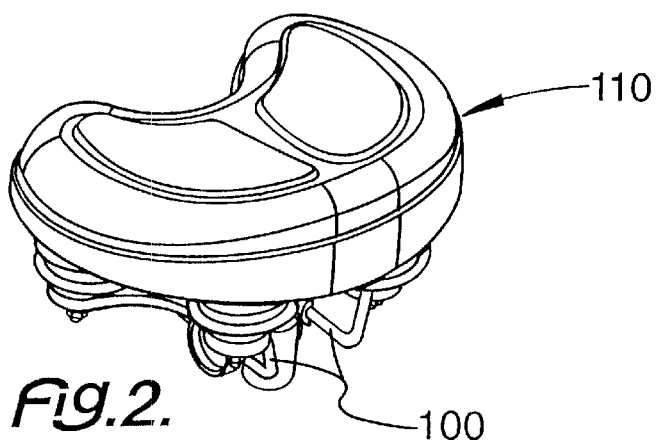
FIG. 2 depicts a top perspective view of ergonomically correct seat 110 using U-shaped bracket 100 of this invention.
Figure 3:
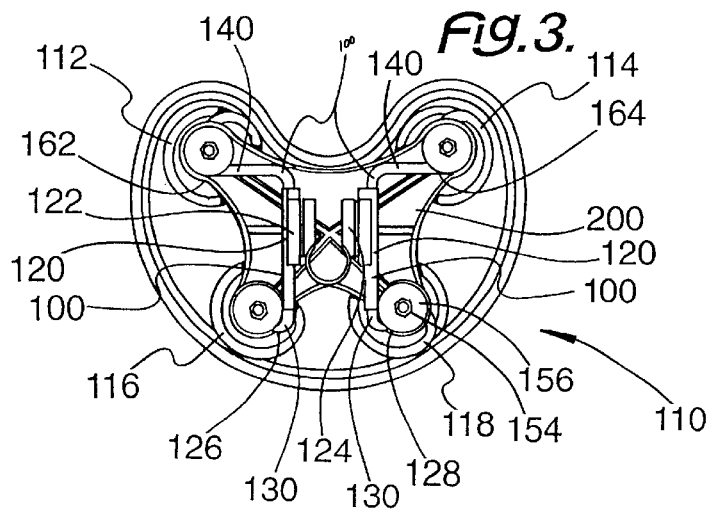
FIG. 3 depicts a bottom plan view of ergonomically correct seat 110 utilizing U-shaped bracket 100 of this invention in pairs.
Figure 4:
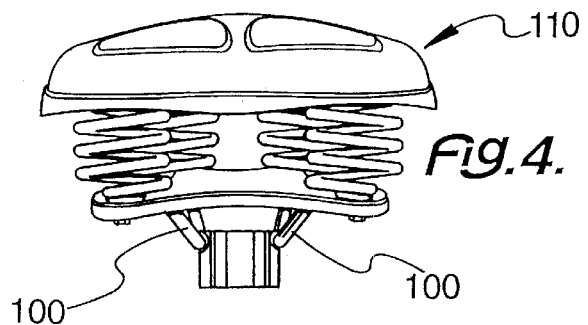
FIG. 4 depicts a front view plan view of ergonomically correct seat 110 of this invention utilizing U-shaped bracket 100 in pairs.
Figure 5:
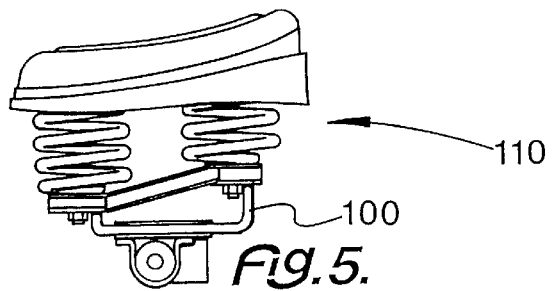
FIG. 5 depicts a side view of ergonomically correct seat 110 of this invention utilizing U-shaped bracket 100 in pairs.
Figure 6:
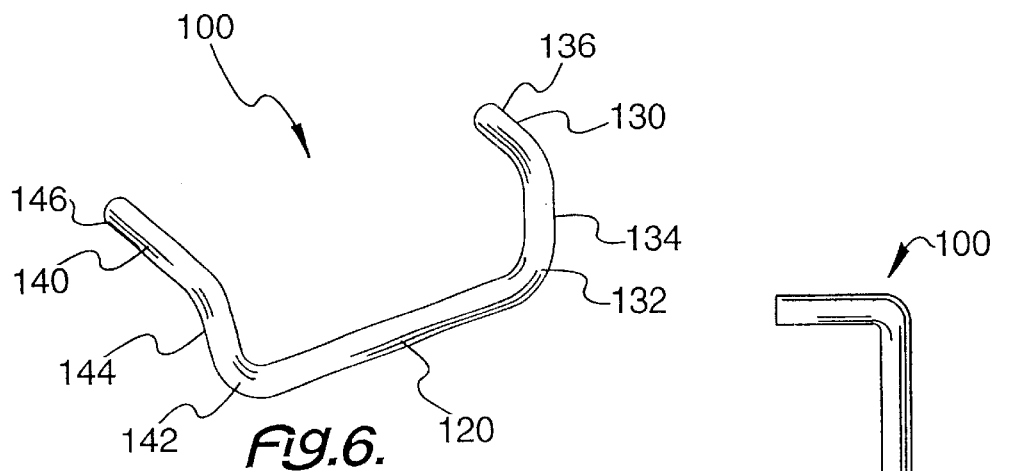
FIG. 6 depicts a perspective view of the U-shaped bracket 100 of this invention.
Figure 7:
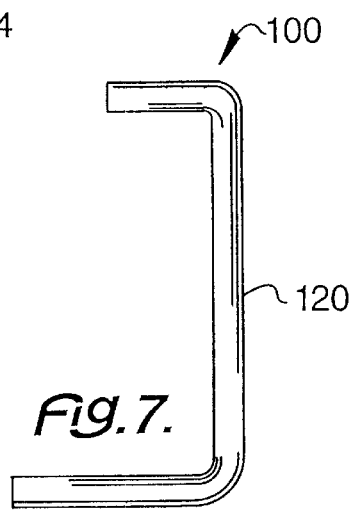
FIG. 7 depicts a top plan view of the U-shaped bracket 100 of this invention.
Figure 8:
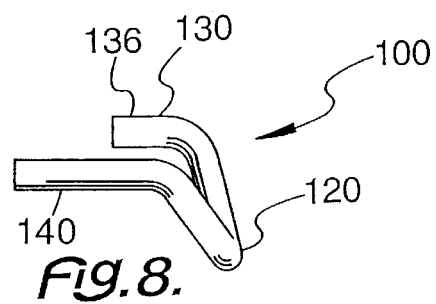
FIG. 8 depicts a side view of the U-shaped bracket 100 of this invention.
Figure 9:
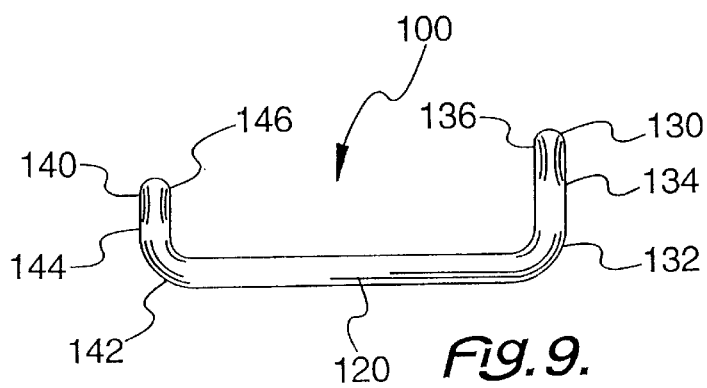
FIG. 9 depicts a rear plan view of the U-shaped bracket 100 of this invention.

A mounting bracket for the ergonomically correct seat includes a pair of U-shaped members. This U-shaped member has a base and angle arms extending therefrom. The angle arms extend from each end of the base and create a symmetry therebetween. The base is clipped to the support member of the bicycle. Each arm is clipped to a support member on the seat.

These U-shaped members are used in tandem permitting the support of each side of the seat while maintaining the flexibility thereof. In this fashion, great advantages are achieved in supporting the seat on any type of bicycle. The arms provide equal support on the side while maintaining the flexibility of the seat as desired.

With this structure, and a removable clipping device mounted to the center post the seat becomes adaptable for fitting to any style of a bicycle. It is especially critical that the clamps, which support the rods have the screws therein mounted such that the screws do not extend below the seat level. That is to say, from side view of the seat, the screws are not visible. In this fashion, the advantages are achieved in supporting the seat in the desired flexibility range.

By screw is meant any suitable fastening device, such a bolt, glue, or equivalent fastener. Screws, however, are preferred for ease of assembly.

The anatomically correct bicycle seat includes a Ushaped member, having incorporated therein an open design in the middle thereof to relieve all pressure on the blood vessels and nerves in the groin area. This revolutionary new seat allows the cyclist's weight to be positioned both laterally and posteriorly onto the ischial tuberosity of the pelvis in order to redistribute the cyclist's weight much like a normal seat. Therefore, the cyclist's weight is more evenly distributed over the structures that are able to support the pressure instead of over the fragile tissues of the anterior pelvis.

This seat will benefit the millions of people who ride conventional and stationary bicycles by allowing the user to have a more secure seat that does not put pressure on the groin region, yet still permitting for a full range of motion for the cyclist to exercise effectively. Moreover, obese individuals will have an even greater benefit as they will have the confidence to ride free from pain and numbness in the groin.

The bicycle seat can eliminate this most unfortunate and serious sequelae from such anatomically damaging seats. The anatomically correct bicycle seat allows the bicyclist to have all of the benefits of bicycle exercise without experiencing numbness of the groin and penis, or delayed or immediate impotence caused by vascular occlusion and nerve compression experienced with the conventional saddle-shaped bicycle seat.

The arc of the U-shaped seat faces the rear of the bicycle. The substantially flat, top edge part of the U-shaped seat may include a pair of arcs in the edge thereof, in order to minimize pressure on the cyclist's body is preferred.

On top of the seat may be a pair of slight protrusions. These protrusions assist the positioning of the buttocks of a bicycle rider, while minimizing the undesired pressure on nerves or blood vessels.

Preferably there are four springs on the seat. The springs are mounted on the underside of the seat. Bolts protrude from the underside of the seat. Each bolt preferably forms the corner of an isosceles trapezoid. spring fits over each bolt.

No matter what the shape of the rod assembly, a length of the rod assembly is clamped to center post of the bicycle, due to a shaped extension of members of the rod assembly extending from the bolt to the center post. The rod assembly relationship to the springs provides support and stability for the seat.

An especially preferred assembly for an anatomically correct bicycle includes a seat platform. Mounted on the seat platform is a shaped pad. A shaped clip member secures the shaped pad to the seat platform.

Below the seat platform are mounted seat springs. Preferably, the seat springs are bolted to the platform, on a bottom side thereof. The seat bolt apertures fit through seat bolt apertures in seat platform, and then through seat springs.

To seat platform is secured a padded derriere support, preferably shaped to conform to the desired seat appearance set forth herein. This support may be a shaped pad formed in any suitable fashion. While the padded derriere support may be glued or other secured to the seat platform, it is preferred to use a clip shaped to match the combination of the seat platform and the padded derriere support, both of which have the same edge outline.

The clip is shaped to fit around and join seat platform to padded derriere support. At a clip base are preferably three wedges adapted to contact the underside edge of seat platform at three different points. The arced side of the clip locks the padded derriere support onto the seat platform. Preferably, the derriere support is preferably a slightly flexible, molded one piece unit.

Additionally, a clamp platform is a preferred option and may be placed below the springs on the seat and held adjacent thereto by the spring bolt. On the clamp platform are four clips adapted the receive the ends of the pair of U-shaped brackets used with the seat. Clamp platform simplifies the assembly of the ergonomically correct seat and provides for efficient attachment to the bicycle.

Referring now to FIG. 1, the ergonomically correct seat 110 is shown as mounted with U-shaped brackets on a bicycle 108. The U-shaped brackets 100 permit the ergonomically correct seat 110 to be mounted on any type of bicycle. Brackets 100 of this invention are especially suitable for mounting a bicycle seat of the type disclosed in U.S. Pat. Nos. 5,988,739 and 6,019,423 to Mr. John P. Dodge and Dr. John R. Dodge.

Nut 154 and washer 156 may be used, if desired, on any bolt. This bolt can be seat bolt 158, clamp bolt 150, spring bolt 206. All bolts may be the same or different sizes. Nut 154 and washer 156 are adjusted accordingly.

Adding FIG. 2, FIG. 3, FIG. 4, and FIG. 5 to the consideration, ergonomically correct seat 110 is depicted as having a first forward spring 112, a second forward spring 114, a first rear spring 116, and a second rear spring 118 combining to form an isosceles trapezoid with the line between first rear spring 116 and second rear spring 118 forming the shorter base of an isosceles trapezoid.

With the additional consideration of FIG. 7, FIG. 8, FIG. 9 and FIG. 10, the mounting of bicycle seat 110 becomes clear. Centrally located therein is a first base clamp 122 and a second base clamp 124 adapted to grip a base 120 of U-shaped bracket 100.

Likewise, extending from base 120 is a short arm 130 and a long arm 140. Long arm 140 is secured in first forward spring clamp 162 and second forward spring clamp 164. Likewise, short arm 130 is received by first rear spring clamp 126 adjacent to first rear spring 116 and second rear spring clamp 128 adjacent to second rear spring 118. In this fashion, the clamps permit the U-shaped bracket 100 to secure the seat 110 to the bicycle 108. The clamp bolt 150 is common to the clamps and must not extend below the lower edge 152 of ergonomically correct seat 110.

Short arm 130 is at right angles to base 120 due to first angle arc 132. Angle arc 132 proceeds from base 120 and extends into angle arm 134. Angle arm 134 terminates in short arm 130 by providing short clamp receiving member 136. Likewise long arm 140 has a second angle arc 142, which is at a right angle to base 120 and proceeds upwardly therefrom at second angle arm 144 and ends in long arm receiving rod 146. Long arm receiving rod 146 is secured in first forward spring 112 or second forward spring 114, while short arm 130 is received in first rear spring 116 or second rear spring 118. With the base clamps 122 or 124 on the base 120, the bicycle seat 110 is thus secured to the bicycle 108.

Adding FIG. 10, FIG. 11, and FIG. 12 to the consideration, clamp platform 200 may be placed below the springs on the seat and held adjacent to first forward spring 112, second forward spring 114, first rear spring 116, and second rear spring 118 by the spring bolts 206. On the clamp platform 200 are four clips 208 adapted to receive the ends of the pair of Ushaped brackets 100 used with the seat 110.

Clips 208 are on viewable side 202 of clamp platform 200. Covered side 204 is adjacent to the springs.

Clamp platform 200 simplifies the assembly of the ergonomically correct seat 110 and provides for efficient attachment to the bicycle 108. Clamp platform 200 has four arced sides 210, with screw platforms 212 at each corner thereof. Each screw platform 212 has a bolt aperture 214 adapted to receive a spring bolt 206, and fasten clamp platform 200 to ergonomically correct seat 110.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent is:

1. A bicycle seat, which is easily mounted on a bicycle and has a minimized adverse effect on a groin and genitalia region of a bicycle rider, comprising:

an anatomically correct seat platform for the bicycle seat cooperating with a support means for the bicycle seat;

the support means including a pair of U-shaped members in order to support the bicycle seat on the bicycle;

the seat platform being adapted to receive buttocks of the bicycle rider, the support means being adapted to mount the seat platform on the bicycle;

the pair of U-shaped members having a first U-shaped member and a second U-shaped member with a similar shape;

the first member having a base and angle arms extending therefrom;

the base having a first end and a second end;

the angle arms including a first angle arm and a second angle arm;

the first end having the first angle arm extending therefrom;

the second end having the second angle arm extending therefrom;

the angle arms being secured to the seat platform;

the base being adapted to secure the bicycle seat to the bicycle;

a bicycle clip securing the base to the bicycle;

one of four seat clips on the anatomically correct seat platform being attached to each of the angle arms, in order to provide for a securing of the seat to the bicycle;

the bicycle clip being a removable clipping device;

the removable clipping device being adapted to be secured to a center post of the bicycle;

the removable clipping device being adapted to receive the base of the first U-shaped member and a base of the second U-shaped member;

the support means including a spring assembly;

the spring assembly receiving the angle arms;

the spring assembly being positioned between the seat platform and the angle arms;

a fastening means securing the spring assembly to the seat platform;

the spring assembly including a first spring, a second spring, a third spring and a fourth spring;

the first U-shaped member and the second U-shaped member receiving the spring assembly;

the first angle arm of the first U-shaped member being secured to the first spring;

the second angle arm of the first U-shaped member being secured to the second spring;

the first angle arm of the second U-shaped member being secured to the third spring;

the second angle arm of the second U-shaped member being secured to the fourth spring;

the fastening means including a first nut and bolt assembly securing the first spring to the seat platform;

the fastening means including a second nut and bolt assembly securing the second spring to the seat platform;

the fastening means being a third nut and bolt assembly securing the third spring to the seat platform;

the fastening means being a fourth nut and bolt assembly securing the fourth spring to the seat platform; and the first nut and bolt assembly, the second nut and bolt assembly, the third nut and bolt assembly, and the fourth nut and bolt assembly being concealed from a side view of the seat platform.

2. The bicycle seat of claim 1 further comprising:

(a) the seat platform having a clamp platform below the spring assembly;

(b) the clamp platform receiving the angle arms; and (c) the clamp platform receiving the fastening means.

3. The bicycle seat of claim 2 further comprising:

(a) the seat platform having an open U-shaped member;

(b) the U-shaped member having an arc adapted to face a rear portion of the bicycle; and (c) the seat platform having a pair of protrusions adapted to assist the positioning of buttocks of a bicycle rider, while minimizing the undesired pressure on nerves or blood vessels.

* * * * *